Patented Feb. 17, 1948

2,436,216

UNITED STATES PATENT OFFICE 2,436,216

FLAMEPROOFING COMPOSITIONS

Earl W. Leatherman, Akron, Ohio

No Drawing. Application December 28, 1942,
Serial No. 470,404

3 Claims. (Cl. 106—18)

This invention relates to flameproofing compositions and particularly to compositions suitable for application to fabrics especially where they are of cellulosic nature.

The basis of the invention resides in the use of catalytic oxides as dehydration agents, particularly as applied to cellulose. Certain very effective flameproofing oxides having excellent dehydration properties are known in the prior art but have the objection that they are poisonous, and that they also tend to cause smoldering or after-glow of treated fabrics which have been ignited. These objections apply particularly to the oxides of antimony and arsenic, and one of the main objects of the present invention is to lessen or even eliminate entirely the toxic action of these oxides and to substantially eliminate tendency toward smoldering or after-glow.

Basically, compositions embodying the invention include four classes of ingredients, namely:

1. A thermally unstable chlorinated resinous material such as chlorinated paraffin wax.
2. A metallic oxide capable of exerting a catalyst dehydrating effect on cellulose in the presence of heat. An example of this is antimony trioxide.
3. A compound capable of reacting with hydrochloric acid to form a deliquescent chloride which is not appreciably volatile at temperatures below 300° C. Zinc oxide is an example.
4. A substance capable of increasing the reactivity of compounds under heading 3 with acids. An example is a metallic soap such as aluminum stearate.

An optional ingredient in the form of anhydrous wool fat may be used for improving the finish, and the composition will as a practical matter include inert colored or opaque material to exert an effective screen action against actinic light rays.

Among the thermally unstable chlorinated resinous materials which are useful in practicing the invention are chlorinated paraffin wax, chlorinated mixtures of paraffin wax and paraffin base oils, chlorinated turpentine, polyvinyl chloride, co-polymers of vinyl chloride and vinyl acetate, chlorinated rubber and the like.

Among the catalytic oxides which may be used as dehydrating agents may be mentioned the oxides of antimony and arsenic, various arsenates and arsenites, stannic oxide, lead dioxide, and red lead (minium).

Among compounds which are suitable in the formation of hydrated deliquescent chlorides are zinc oxide, calcium carbonate, magnesium carbonate, aluminum acetate, aluminum oleate, ferric hydroxide. As here used, the term hydroxide is intended to include hydrated or precipitated oxides. Compounds of this character may be used alone or in combination with other compounds having a similar function.

Materials of the character just mentioned are improved in reactivity by the presence of the activating substance referred to above under item 4. Suitable activators are water insoluble fatty acids with metallic soaps, rosin acids with metallic resinates, and naphthenic acids with metallic naphthenates.

In general it is preferred to use an organic acid associated with a metallic salt of another organic acid. Among the fatty acids particularly suited as activators are oleic, stearic, lauric and palmitic. The use of other fatty acids is contemplated where they possess the activating characteristics referred to above. The water insoluble metallic soaps of these acids associated with the acids provide a peculiarly effective activating combination, but any water insoluble naphthenates, either with or without free naphthenic acid, are effective. Likewise effective are the resin acids with or without water insoluble metallic salts of the resin acids. In some instances it has been found that anhydrous wool fat has a beneficial effect when used in connection with the activating substances enumerated above. The activating substance may consist of a single compound or a mixture of compounds.

Suitable inert colored and opaque pigments include yellow iron oxide, black iron oxide, chromic oxide, lamp black, umbers, ochres, siennas, red iron oxide, flake aluminum pigment, and the like.

Catalytic oxides have been used in the prior art with thermally unstable chlorinated resins, but compositions so constituted possess the marked disadvantage that the thermally unstable resins are also slightly unstable at ordinary temperatures and liberate hydrogen chloride at ordinary temperatures. For example, antimony trioxide, which is relatively non-toxic, is converted by hydrochloric acid into antimony oxychloride which is decidedly toxic in nature. Extensive experimentation has demonstrated the fact that this toxicity may be definitely overcome by the use with the catalytic oxides and the thermally unstable chlorinated resins, of materials such as zinc oxide so as to maintain a slight degree of alkalinity in the mixture and thus to prevent formation of toxic antimony oxychloride.

Since the fireproofing action of the present composition is due in large part to the formation of hydrated deliquescent chlorides under the influence of heat, it is possible through the use of the compositions of the present invention to greatly reduce the proportion of catalytic oxides employed over those of analogous compositions of the prior art, and at the same time to greatly reduce the toxicity of the material. The influence of materials such as zinc oxide is so marked that in some cases, by use of zinc oxide as a material which forms the source of the hydrated deliquescent salt, it is feasible to omit the dehydrating catalyst entirely. Under such circumstances, some moisture is evolved from the cellulose when it is subjected to heat, and this moisture serves to hydrate the resultant zinc chloride which is formed.

The theory of operation of compositions embodying the present invention is believed to be approximately as follows: When heat is applied to cellulose material treated with the composition, the thermally unstable chlorinated resin decomposes with the evolution of hydrogen chloride. Concurrently, the catalytically active oxide causes the cellulose to break up into water and carbon. The liberated hydrogen chloride and the evolved moisture react simultaneously with another ingredient of the composition, for example the zinc oxide, to form a hydrated deliquescent chloride which exerts a very effective fireproofing and glow-proofing action.

In practicing the invention it becomes possible to reduce to a minimum the toxic ingredients employed and thus not only to conserve certain vital strategic materials, but also to improve the fireproofing characteristics of the material and to substantially eliminate toxic effects which have heretofore been visited upon either workers who manufacture the treated fabric or upon users of the fabricated articles so treated.

The following are examples of compositions suitable for use according to the present invention:

I

| | Parts |
|---|---|
| Zinc oxide | 7 to 12 |
| Antimony trioxide | 3 to 6 |
| Opaque pigments | 11 to 14 |
| Chlorinated paraffin wax | 12 to 15 |
| Aluminum stearate | 1 to 3 |
| Oleic acid | 1 to 3 |
| Solvent to thin as desired. | |

II

| | Parts |
|---|---|
| Zinc oxide | 10 to 14 |
| Opaque pigments | 11 to 14 |
| Calcium carbonate | 1 to 4 |
| Copper oleate | 1 to 3 |
| Oleic acid | 1 to 3 |
| Chlorinated paraffin wax | 9 to 12 |
| Vinyl chloride—vinyl acetate co-polymer | 1 to 3 |
| Solvent to thin as desired. | |

III

| | Parts |
|---|---|
| Zinc oxide | 9 to 12 |
| Antimony oxychloride | 2 to 4 |
| Opaque pigments | 11 to 14 |
| Calcium carbonate | 1 to 3 |
| Chlorinated mixture of parafin wax and paraffin oil | 12 to 15 |
| Aluminum stearate | 1 to 3 |
| Oleic acid | 1 to 3 |
| Solvent to thin as desired. | |

IV

| | Parts |
|---|---|
| Zinc oxide | 7 to 9 |
| Antimony trioxide | 2 to 4 |
| Chlorinated paraffin wax | 12 to 15 |
| Calcium carbonate | 1 to 3 |
| Magnesium carbonate | 1 to 3 |
| Opaque pigments | 11 to 14 |
| Oleic acid | 2 to 3 |
| Anhydrous wool fat | 1 to 3 |
| solvent to dilute as desired. | |

V

| | Parts |
|---|---|
| Zinc oxide | 7 to 9 |
| Calcium arsenate | 2 to 4 |
| Magnesium carbonate | 1 to 3 |
| Calcium carbonate | 1 to 3 |
| Copper oleate | 1 to 3 |
| Stearic acid | 1 to 3 |
| Opaque pigments | 11 to 14 |
| Chlorinated paraffin wax | 12 to 15 |
| solvent to dilute as desired. | |

VI

| | Parts |
|---|---|
| Zinc oxide | 10 to 14 |
| Opaque pigments | 11 to 14 |
| Chlorinated paraffin | 12 to 16 |
| Aluminum stearate | 1 to 3 |
| Oleic acid | 1 to 3 |
| Solvent to thin as desired. | |

VII

| | Parts |
|---|---|
| Zinc oxide | 10 to 14 |
| Opaque pigments | 11 to 14 |
| Chlorinated paraffin | 12 to 16 |
| Aluminum oleate | 1 to 3 |
| Oleic acid | 1 to 3 |
| Solvent to thin as desired. | |

VIII

| | Parts |
|---|---|
| Zinc oxide | 15 |
| Opaque pigments | 15 |
| Chlorinated paraffin | 15 |
| Aluminum oleate | 2 |
| Oleic acid | 2 |
| Solvent to thin as desired. | |

IX

| | Parts |
|---|---|
| Zinc oxide | 12 to 18 |
| Red lead | 5 to 15 |
| Chlorinated paraffin | 12 to 16 |
| Opaque pigments | 12 to 16 |
| Oleic acid | 1 to 3 |
| Stearic acid | 1 to 3 |
| Solvent to thin. | |

In the above reference to thermally unstable chlorinated resins, it is to be understood that their suitability will be defined not so much by the percentage of chlorine which they contain as by the rate at which chlorine is given off in the form of hydrogen chloride.

The action of the zinc oxide employed in compositions of the present invention appears to be independent of the type of zinc oxide used. It has been found that the fireproofing action is fully as effective with American process zinc oxide prepared by burning, as it is with the French process variety which is chemically precipitated. This is of marked advantage since it cheapens the process by using low priced and readily available domestic products.

In making up compositions according to the present invention, the ingredients are suitably mixed and dispersed as by a roller mill, and after dilution by any compatible solvent to permit their application to cellulosic fibers or textiles, they may be applied to the fabric and the dispersion medium subsequently removed by evaporation. The application of the composition may also be carried out by emulsification in water rather than by the use of a solvent.

What is claimed is:

1. A flameproofing composition comprising a thermally unstable chlorinated resinous material, a material capable of reacting with hydrogen chloride to form a deliquescent chloride not appreciably volatile below 300° C., said material being from the class consisting of zinc oxide and ferric hydroxide, a water insoluble higher fatty acid, and a water insoluble metallic soap.

2. A non-toxic fireproofing composition comprising approximately 12–15 parts by weight of chlorinated paraffin wax, 10–15 parts zinc oxide, 1–3 parts aluminum stearate, 1–3 parts oleic acid, 11–15 parts opaque pigment, and suitable solvent to thin the mixture.

3. A fireproofing composition for cellulose, comprising a thermally unstable chlorinated resinous material capable of decomposing and giving off chlorine-containing gas at a temperature approaching the combustion temperature of cellulose, a substance capable of reacting with hydrogen chloride to form a deliquescent chloride not appreciably volatile at 300° C. and comprising a mixture of zinc oxide and ferric oxide, a water insoluble higher fatty acid, a water insoluble metallic soap, and a dehydration catalyst for cellulose, said catalyst being from the class consisting of lead dioxide, and red lead.

EARL W. LEATHERMAN.

REFERENCES CITED

The following references are of record in the file of this patent:

UNITED STATES PATENTS

| Number | Name | Date |
|---|---|---|
| 2,314,242 | Porter | May 16, 1943 |
| 2,299,612 | Clayton et al. | Oct. 20, 1942 |
| 2,286,744 | Leatherman | June 16, 1942 |
| 2,052,886 | Leroy | Sept. 1, 1936 |
| 2,044,176 | McCulloch | June 16, 1936 |
| 1,975,072 | Booth | Oct. 2, 1934 |
| 2,167,278 | Leatherman | July 25, 1939 |
| 2,326,233 | Leatherman | Aug. 10, 1943 |
| 2,378,715 | Leatherman | June 19, 1945 |

FOREIGN PATENTS

| Number | Country | Date |
|---|---|---|
| 444,403 | Great Britain | Mar. 19, 1936 |
| 505,989 | Great Britain | May 18, 1939 |